United States Patent
Black et al.

(10) Patent No.: US 9,723,061 B1
(45) Date of Patent: *Aug. 1, 2017

(54) TRANSPORT PROTOCOL INDEPENDENT COMMUNICATIONS LIBRARY

(71) Applicant: Google Inc., Mountain View, CA (US)

(72) Inventors: David Black, Mountain View, CA (US); Amay Nitin Champaneria, San Francisco, CA (US); Benjamin J. McMahan, San Jose, CA (US); Douglas V. Simpkinson, Boulder Creek, CA (US); Joseph S. Hurst, San Francisco, CA (US); Kyle Scholz, Mountain View, CA (US); Andrew J. Martone, San Francisco, CA (US); Jason L. Roberts, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 14/330,515

(22) Filed: Jul. 14, 2014

Related U.S. Application Data

(63) Continuation of application No. 12/859,734, filed on Aug. 19, 2010, now Pat. No. 8,812,733.

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC .. H04L 12/4633; H04L 65/60; H04L 67/2823
(Continued)

(56) References Cited

U.S. PATENT DOCUMENTS 5,838,916 A * 11/1998 Domenikos ............. G06F 9/445
  709/217
6,006,225 A   12/1999 Bowman
(Continued)

FOREIGN PATENT DOCUMENTS

WO    WO2010105666 A1    9/2010

OTHER PUBLICATIONS

'Closure-Library.' closure-library—Closure Library—Google Project Hosting [online]. 2011 [retrieved on Aug. 16, 2011]. Retrieved from the Internet electronic mail: http://code.google.com/p/closure-library/.

(Continued)

*Primary Examiner* — Douglas Blair
(74) *Attorney, Agent, or Firm* — Fish & Richardson P.C.

(57) ABSTRACT

Methods, systems, and apparatus, including computer programs encoded on a computer storage medium, for a transport protocol independent communications library. In one aspect, a method includes receiving a communication request from a client device and processed according to a selected transport protocol, generating a response to the communication request, the response including data responsive to the communication request and one or more feature values specifying one or more communication features for the communication request, each communication feature being independent of the selected transport protocol, and providing the response to the communication request according to the selected transport protocol.

20 Claims, 4 Drawing Sheets

(58) Field of Classification Search
USPC .......................................... 709/230, 227, 228
See application file for complete search history.

(56) References Cited

U.S. PATENT DOCUMENTS

| | | | | |
|---|---|---|---|---|
| 6,065,043 | A * | 5/2000 | Domenikos | G06F 9/445 709/203 |
| 6,115,741 | A * | 9/2000 | Domenikos | G06F 9/445 709/216 |
| 6,370,518 | B1 | 4/2002 | Payne | |
| 6,377,965 | B1 | 4/2002 | Hachamovitch | |
| 6,411,950 | B1 | 6/2002 | Moricz | |
| 6,697,849 | B1 | 2/2004 | Carlson | |
| 6,751,606 | B1 | 6/2004 | Fries | |
| 6,934,756 | B2 * | 8/2005 | Maes | G10L 15/30 370/352 |
| 7,103,470 | B2 | 9/2006 | Mintz | |
| 7,395,343 | B1 * | 7/2008 | Baker | H04L 12/4633 709/230 |
| 7,483,880 | B2 | 1/2009 | Rossi | |
| 7,672,932 | B2 | 3/2010 | Hood | |
| 7,701,856 | B2 * | 4/2010 | Marcondes | H04L 47/10 370/235 |
| 7,725,485 | B1 | 5/2010 | Sahami | |
| 7,752,326 | B2 | 7/2010 | Smit | |
| 7,836,044 | B2 | 11/2010 | Kamvar | |
| 8,060,639 | B2 | 11/2011 | Smit | |
| 8,112,529 | B2 | 2/2012 | van den Oord et al. | |
| 8,156,109 | B2 | 4/2012 | Kamvar | |
| 8,332,467 | B2 | 12/2012 | Howard | |
| 9,461,817 | B2 * | 10/2016 | Moore | H04L 9/08 |
| 2002/0116454 | A1 * | 8/2002 | Dyla | G06Q 30/06 709/203 |
| 2004/0186827 | A1 | 9/2004 | Anick | |
| 2004/0199498 | A1 | 10/2004 | Kapur | |
| 2005/0055337 | A1 | 3/2005 | Bebo | |
| 2006/0190436 | A1 | 8/2006 | Richardson | |
| 2006/0206454 | A1 | 9/2006 | Forstall | |
| 2006/0271429 | A1 | 11/2006 | Borgs | |
| 2007/0050339 | A1 | 3/2007 | Kasperski | |
| 2007/0078828 | A1 | 4/2007 | Parikh | |
| 2007/0143262 | A1 | 6/2007 | Kasperski | |
| 2008/0109401 | A1 | 5/2008 | Sareen | |
| 2008/0177717 | A1 | 7/2008 | Kumar | |
| 2008/0195577 | A1 | 8/2008 | Fan | |
| 2008/0208825 | A1 | 8/2008 | Curtis | |
| 2008/0256061 | A1 | 10/2008 | Chang | |
| 2008/0301098 | A1 | 12/2008 | Bernard | |
| 2008/0319952 | A1 | 12/2008 | Carpenter | |
| 2009/0043741 | A1 | 2/2009 | Kim | |
| 2009/0083232 | A1 | 3/2009 | Ives | |
| 2009/0094211 | A1 | 4/2009 | Marvit | |
| 2009/0094551 | A1 | 4/2009 | Alkov | |
| 2009/0106224 | A1 | 4/2009 | Roulland | |
| 2009/0119289 | A1 | 5/2009 | Gibbs | |
| 2009/0157859 | A1 * | 6/2009 | Morris | H04L 61/304 709/223 |
| 2009/0179778 | A1 | 7/2009 | Molla | |
| 2009/0187515 | A1 | 7/2009 | Andrew | |
| 2009/0240683 | A1 | 9/2009 | Lazier | |
| 2010/0057932 | A1 * | 3/2010 | Pope | H04L 69/16 709/236 |
| 2010/0169469 | A1 | 7/2010 | Malladi | |
| 2010/0281107 | A1 * | 11/2010 | Fallows | G06F 9/54 709/203 |
| 2010/0306228 | A1 | 12/2010 | Carpenter | |
| 2011/0087795 | A1 | 4/2011 | Puri | |
| 2011/0201387 | A1 | 8/2011 | Paek | |
| 2011/0299540 | A1 * | 12/2011 | Chen | G06Q 20/10 370/401 |
| 2012/0036278 | A1 * | 2/2012 | Rafsky | G06Q 10/10 709/232 |
| 2012/0047135 | A1 | 2/2012 | Hansson | |
| 2012/0167009 | A1 | 6/2012 | Davidson | |
| 2012/0243534 | A1 * | 9/2012 | Rafsky | G06Q 10/10 370/389 |
| 2013/0046878 | A1 | 2/2013 | Fryc | |
| 2014/0047322 | A1 | 2/2014 | Kim | |

OTHER PUBLICATIONS

Closure Library (Labs). Finding Your Way around the Closure Library—Closure Library—Google Code [online]. 2011 [retrieved on Aug. 16, 2011]. Retrieved from the Internet electronic mail: http://code.google.com/closure/library/docs/introduction.html.
'Closure Library (Labs).' Event Handling—Closure Library—Google Code [online]. 2011 [retrieved on Aug. 16, 2011]. Retrieved from the Internet electronic mail: http://code.google.com/closure/library/docs/events_tutorial.html.
'Closure Templates (Labs).' Closure Templates—Google Code [online]. 2011 [retrieved on Aug. 16, 2011]. Retrieved from the Internet electronic mail http://code.google.com/closure/templates.
'The official Google Code blog.' Introducing Closure Tools—The official Google Code blog [online]. Nov. 5, 2009 [retrieved on Aug. 16, 2011]. Retrieved from the Internet electronic mail: http://googlecode.blogspot.com/2009/11/introducing-closure-tools.html.
'XMLHttpRequest.' XMLHttpRequest—Wikipedia, the free encyclopedia [online], last modified on Aug. 11, 2011 [retrieved on Aug. 16, 2011]. Retrieved from the Internet electronic mail: http://en.wikipedia.org/wiki/XHR.
'JSONP' JSONP—Wikpedia, the free encyclopedia [online]. [retrieved on Aug. 16, 2011]. Retrieved from the Internet electronic mail: http://en.wikipedia.org/wiki/JSONP.
Chennavasin, Don "A look inside the world of search from the people of Yahoo!" http://www.ysearchblog.com/archives/000301.html. Yahoo! Search blog: Livesearch on AlltheWeb, May 9, 2006, 5 pages.
YouTube.com "Livesearch: Predictive Search Engine from Yahoo (2006)" http://www.youtube.com/watch?v=_EaSocSYSB8. [online] [retrieved Aug. 19, 2011].
McGee, Matt "Yahoo Had Instant Search in 2005 & Dropped it; Bing Kind of Has it Now," http://www.searchengineland.com. Sep. 9, 2010, 12 pages.
"The Real Live Search" http://www.istartedsomething.com/livesearch. [online] [retrieved on Aug. 5, 2011] 1 page.
Office Action issued in U.S. Appl. No. 12/859,734 on Jun. 6, 2013, 48 pages.
Office Action issued in U.S. Appl. No. 12/859,734 on Feb. 20, 2014, 11 pages.
Notice of Allowance issued in U.S. Appl. No. 12/859,734 on May 12, 2014, 18 pages.

* cited by examiner

US 9,723,061 B1

TRANSPORT PROTOCOL INDEPENDENT COMMUNICATIONS LIBRARY

CROSS-REFERENCE TO RELATED APPLICATION

This application is a continuation of U.S. application Ser. No. 12/859,734, filed Aug. 19, 2010, the contents of which is incorporated by reference.

BACKGROUND

This specification describes technologies relating to client and server communications.

Designing web pages to accommodate client-server communication in multiple web browsers today is very difficult. Each web browser implements some subset of various standards and has different capabilities and shortcomings, necessitating a substantial amount of browser-specific coding. There are also many different transport protocols used to implement client and server communication, such as XMLHttpRequest (XHR), JavaScript Object Notation (JSON), JSON with Padding (JSONP), embedded iFrames, browserchannel, Flash, and WebSockets, to name just a few. Each of these protocols has their own downsides, some of which can, with difficulty, be worked around. Additionally, new transport protocols are constantly being developed, and the adoption rate of the new protocols is not uniform. For example, some developers may incorporate a new transport protocol into their browser while the protocol is still in a developmental stage, while other developers may not incorporate the protocol into their browsers until well after the protocol is initially released, if ever.

Thus, every time a developer wants to write a client-side resource, such as a JavaScript feature, that requires client-server communication, he or she must manage the coding effort to accommodate for multiple different capabilities for multiple different client agents, and must also monitor the ever changing mix of capabilities.

Various libraries have been written to address first problem, i.e., that of browser-specific code being required to implement individual transport methods, but none of these libraries have the capability to handle multiple different transport protocols for multiple different client agents. Instead, these libraries offer implementations of individual browser-agnostic transport channels. Thus, while developers do not need to write browser-specific code using these libraries, they are still bound to a single channel type across multiple browsers.

SUMMARY

In general, one innovative aspect of the subject matter described in this specification can be embodied in methods that include the actions of accessing a communications library stored in a computer memory of the computer, the communications library supporting client agents of multiple different types, each of the client agents supporting one or more transport protocols; receiving a communication request from a client module executing in a client agent on the computer, the request being independent of the transport protocols; selecting one of the transport protocols the client agent is determined to support; and processing the communication request according to the selected transport protocol. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving a communication request from a client device and processed according to a selected transport protocol; generating a response to the communication request, the response including data responsive to the communication request and one or more feature values specifying one or more communication features for the communication request, each communication feature being independent of the selected transport protocol; and providing the response to the communication request according to the selected transport protocol. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The transport protocol independent communications library allows developers to write common code that works across browsers and takes advantage of multiple transport protocols available in each of the browsers. When new transport protocols are developed, only the underlying transport subroutines needs to be updated; legacy code built on top of the transport subroutines need not be revised to take advantage of the new transport protocol. This results in a much less complex coding space, which reduces development time and costs. The communications library makes request subroutines, used by scripts in an application, independent of the transport protocol used by the communications library. The communications library allows multiplexing of different types of communication requests over the same channel and reduces the amount of setup time needed for opening a channel for each script that sends a communication request to the communications library.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
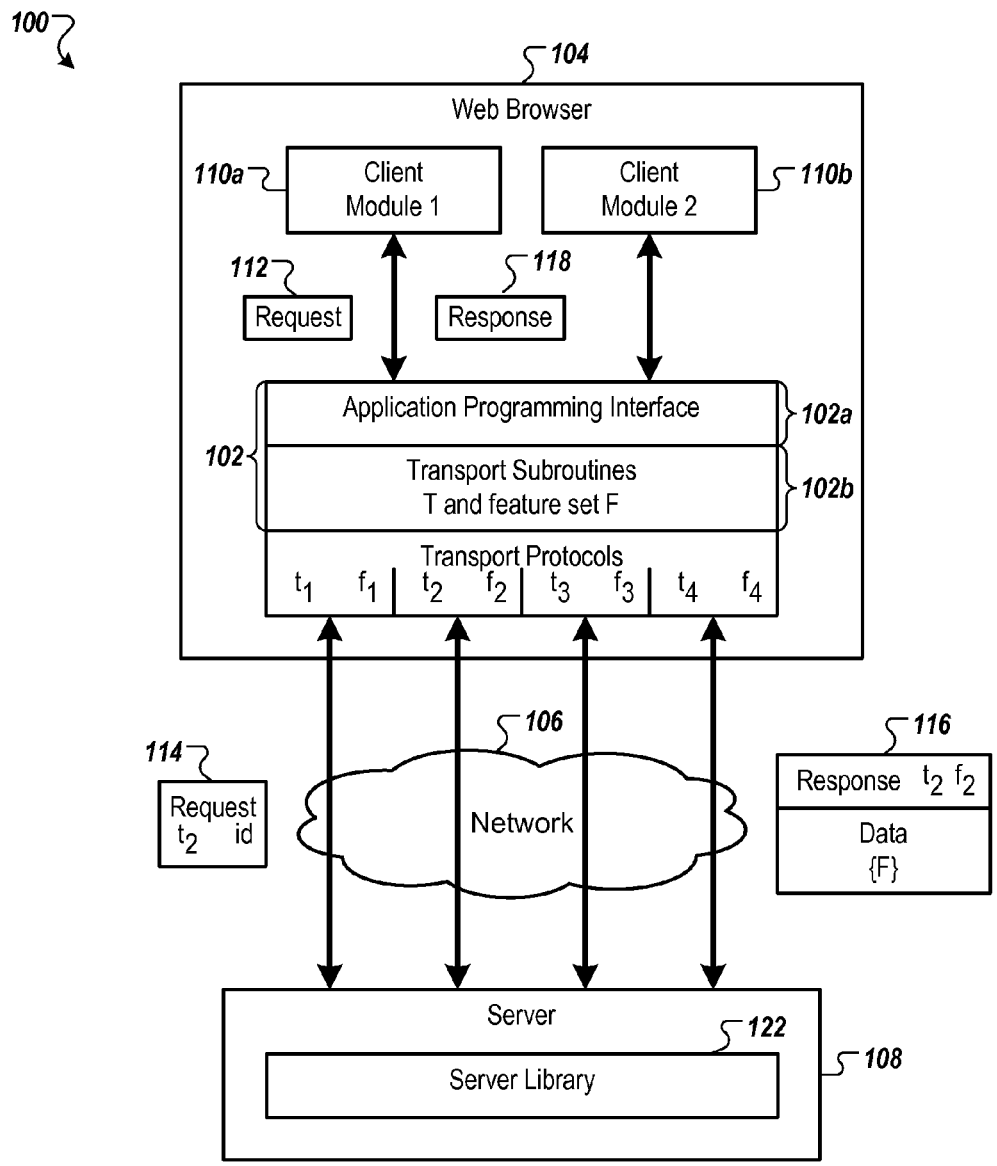
FIG. 1 is a block diagram of an example environment in which a communications library selects a transport protocol supported by a client agent.

This specification describes technologies relating to a communications library loaded on a client agent that receives a communication request, which is independent of a transport protocol, from a client module. The communications library selects a transport protocol supported by the client agent, and processes the communication request according to the transport protocol. Processing of the communication request can include sending a modified communication request to a server according to the selected transport protocol.

The server receives the communication request, generates a response to the communication request, and provides the response to the communications library according to the selected transport protocol. The response includes data responsive to the communication request and feature values associated with the data, where the feature values correspond to communication features that are independent of the selected transport protocol.

As used herein, a communication feature is a feature that is used to support a particular communication request. In the context of an underlying transport protocol, a communication feature is a particular feature that is supported by the particular protocol. In the context of the communication request provided to the communications library, however, the communication feature of the communication request is independent of a transport protocol, as the communication library supports multiple communication features that may not be supported by a particular underlying transport protocol. Thus, the communication library is able to support communication features that may not be supported by an underlying protocol that is selected to communicate data of the communication request. As will be explained in more detail below, the communication library exposes primitives to the client module that are converted to a particular transport channel and sent to a server with metadata allowing the primitives to work regardless of the transport channel selected. For example, in some implementations, the responsive data and the feature values are placed in a wrapper in order to send feature values independent of the selected transport protocol to the communications library.

The communications library extracts the requested data and associated feature values from the response and provides the data to the client module. The client module receives the data and is unable to determine the selected transport protocol used to communicate with the server.

When new transport protocols are developed, only underlying transport subroutines need to be updated and an application programming interface (API) of the communications library does not need to be revised to take advantage of the new transport protocols. Additionally, when new client agents are developed, only the transport subroutines need to be updated and the API remains the same. For example, when a new web browser is developed, the transport subroutines of the communications library are updated in order to allow a script to run on the new web browser without changing the script. This allows the same script to run on different web browsers without the need to customize the script for each web browser.

The communications library allows multiple different client modules to send different types of communication requests over the same channel with the same server. This reduces the amount of setup time needed for opening a channel for each client module that sends a communication request to the communications library. For example, when three client modules are communicating through the communications library with the same server, the communications library needs to open only one communication channel instead of three. Additionally, this can allow communication of requests over a transport protocol when the transport protocol would not normally support the communication request and/or the data response responsive to the communication request.

§1.1 Example Environment

FIG. 1 is a block diagram of an example environment 100 in which a communications library 102 selects a transport protocol supported by a client agent. For example, the client agent can be a web browser 104. Alternative client agents include streaming media players, download managers, and other programs that can send and receive data over a network 106. The web browser 104 can enable a user to display and interact with text, images, videos, music, and other information.

The server 108 includes information that can be requested by the web browser 104. For example, the server 108 can provide the web browser 104 with resources, such as HTML and scripts, which cause the web browser 104 to generate a web page.

The network 106, such as a local area network (LAN), a wide area network (WAN), the Internet, or a combination thereof, connects the web browser 104 to the server 108. The environment 100 may include many thousands of client agents and servers 108. Different types and/or versions of client agents can connect to the same server 108.

The web browser 104 includes a first client module 110*a* and a second client module 110*b*. The client modules 110*a-b* can request resources from the server 108 for presentation in the web browser 104. For example, the client modules 110*a-b* can be scripts, such as JavaScript or another ECMAScript, that request web page content from the server 108 for presentation in a web page. In one example, the first client module 110*a* is a script for a search box in a first tab in the web browser 104 and the second client module 110*b* is a script for a search results page in a second tab in the web browser 104. In another example, both client modules 110*a-b* are associated with the same tab in the web browser 104.

The client modules 110*a-b* are provided to the web browser 104 in response to a request for a resource. For example, the web browser 104 can provide a universal resource identifier (URI) request to the server 108, and the server 108 can provide the client modules 110*a-b* to the web browser 104 in response to the request.

The web browser 104 is one of multiple different types or multiple different versions, with each of the web browsers supporting one or more transport protocols. Some of the different types and different versions of web browsers support different transport protocols. For example, a newest version of a web browser supports WebSockets and an older version of the web browser does not. Alternatively, a first browser type supports XHR and a second browser type does not, and so on.

§2.0 Communications Library

The web browser 104 includes the communications library 102, which determines a transport protocol to use for communication between the client modules 110*a-b* and the server 108. The communications library 102 is provided to the web browser 104 from the server 108 in response to a resource request, e.g., the URI request above, and the communications library 102 is dynamically loaded on the web browser 104.

In some implementations, the communication library 102 implements a library communication protocol that exposes four basic operations to the client modules 110 —opening a connection to a server, sending data to the server, receiving data from the server, and closing the connection. Within the library communication protocol, additional features are supported, and each of the features is supported independent of the underlying transport protocol that is used to process the request. Examples of these additional features include metadata support, request-response semantics, user sessions, caching, multiplexing, and progressive evaluation. The metadata support allows the client module to deal with responses from the server as discrete objects with identifiers and types, rather than a pure stream of data. The request-response semantics allows the client module to know that a certain piece of data received was sent in response to a particular request. The user session support allows the server side and the client module to send a unique and constant identifier with every request and response, so the server and client module can identify related response and requests. The caching support enables a client module and communications library to manage a cache for storing data responsive to requests that may be sent multiple times. Thus, if the client modules sends the same piece of data multiple times, the communication library need not query the server for it each time, as the data may be stored in the cache. Multiplexing support allows multiple modules in a single webpage instance to use just one open connection and share it intelligently between the modules. Progressive evaluation supports allows the server to break a large amount of data in a reply into smaller amounts of data and send each reply separately.

These example features above are illustrative, and the list is not exhaustive. More of fewer communication features can be supported by the library communication protocol.

The communications library 102 includes support for two or more transport protocols, $t_1$, $t_2$, $t_3$, $t_4$, etc. Each of the transport protocols is associated with a feature set, $f_1$, $f_2$, $f_3$, $f_4$, etc., that defines how data can be sent and received. For example, communication features can include a cache storage and a cache timeout, and the corresponding feature values can define if received data is cached and a cache timeout value.

The communications library 102 defines a communication feature set F for the communication library protocol, where each communication feature is independent of the transport protocols. The communication feature set F allows the client modules 110a-b to send information requests to the server 108 without knowledge of the specific transport protocol used to send the requests. Similarly, the communication feature set F allows the client modules 110a-b to receive information responses from the server 108 without knowledge of the transport protocol the server 108 used. For example, the feature set F can include a response id feature and a resource identifier feature.

When the client module 110a sends a request 112 to the communications library 102 an API 102a receives the request 112. The API 102a allows the request 112 from the first client module 110a to be independent of the transport protocols supported by the web browser 104. For example, the API 102a abstracts the notion of a communication request so that the first client module 110a can send the request 112 independently of a transport protocol. For example, the first client module 110a provides the request 112 for "http://www.foo.com/bar?id=4" to the API 102a. The API does not need to select the transport protocol that will be used to send the request to the server 108.

The request 112 can include one or more feature values associated with features in the feature set F. For example, the request 112 can indicate that the communications library 102 should use either WebSockets or Progressive XHRs to send the communication request and not send the communication request otherwise. For example, the request 112 can be "http://www.foo.com/bar?id=4&tch=1&tch=2" where "tch=1&tch=2" indicates the preferred communication channels.

The communications library 102 receives the request 112 and transport subroutines 102b select one of the transport protocols the web browser 104 supports. For example, the transport subroutines 102b can determine a preferred transport protocol $t_2$ specified by the web browser 104 and/or by the communications library 102.

In some implementations, when the request 112 includes preferred transport protocols, the transport subroutines 102b can determine which of the preferred transport protocols the web browser 104 supports and select one of the preferred transport protocols the web browser 104 is determined to support. For example, the transport subroutines 102b determine that the web browser 104 does not support WebSockets but does support Progressive XHRs.

The transport subroutines 102b process the request 112 according to the selected transport protocol and provide the transport protocol specific request 114 to the server 108. For example, the transport subroutines 102b appends feature values "tch=2&psi=5555&ech=1" to the request 112 "http://www.foo.com/bar?id=4" and the communications library 102 sends an XHR request 114 to the server 108 for the URI "http://www.foo.com/bar?id=4&tch=2&psi=5555&ech=1."

The feature values appended to the request 112 is used by the server 108 to determine protocol specific values and session related values. For example, "tch=2" indicates that the web browser 104 is using the Progressive XHR transport protocol, the value "psi=5555" indicates the web browser's session id so that, if the server 108 chooses, the server 108 can match the request 114 with any previous requests from the web browser 104, and "ech=1" indicates that this is the first request from the web browser 104.

§2.1 Communications Request Response

In some implementations, the server implements a server library 122 that is a counterpart to the library 102, and the response is sent back in a wrapper format, e.g., the response includes the data responsive to the communication request and one or more feature values specifying one or more communication features for the communication request. In some implementations, the response is wrapped as a JSON object with metadata corresponding to the communication library features. One example object includes a unique identifier u, a cache parameter c, a cache timeout parameter ct, a response identifier e and data d.

The unique identifier u includes information identifying the client module datatype. If the datatype is not set, the response is returned to the client module as raw data.

The cache behavior parameter c informs the communications library whether or not this is a partial reply for progressive evaluation, and/or if the communications library should remove any items associated with this identifier from its cache. If the cache behavior parameter is not set, then the response is not cached.

The cache timeout parameter ct long the communications library should keep this data around in its cache before throwing it out or invalidating it. If unset, uses a default value.

The response identifier e is by the communications library to piece together partial responses, such as in the case of progressive evaluation.

Finally, the data d is the data to return to the client module.

The server 108 receives the request 114 and generates a response 116 to the request 114. The response 116 includes data responsive to the request 114 and one or more feature values {F} specifying one or more communication features for the communication request, where each communication feature is independent of the selected transport protocol. The feature values {F} can be associated with features in the feature set F.

For example, the server 108 determines the data "Hello there" is responsive to the request 114 based on the received URI value "bar?id=4" and combines the data with feature values, e.g., metadata, in a wrapper. In some implementations, the structure of the data in the wrapper is as follows:
{
u: "http://www.foo.com/bar?id=4&ech=1"
c: 1
e: 1000
d: "Hello there"
},
where u value indicates the request the response 116 is responsive to, the c value of 1 indicates that the server will send additional responses that are responsive to the request, and e value being the response identifier.

The server 108 identifies feature values for the features $f_2$ associated with the selected transport protocol $t_2$ and includes the identified feature values in the response 116. The server 108 provides the response 116 to the communications library 102 using the selected transport protocol $t_2$ and the communications library 102 extracts the wrapped data and feature values from the response 116.

The communications library 102 determines, based on the feature value of c, that one or more additional responses will be received from the server 108 and stores the extracted data and feature values in a cache with a cache key "bar?id=4." The communications library 102 determines that the response 116 is responsive to the request 114 based on the value "ech=1," e.g., the first request the communications library 102 sent.

Extraction of the wrapped data from the response 116 allows the communications library 102 to use the feature set F independently of the feature set $f_2$ associated with the selected transport protocol $t_2$. For example, the feature set F can include features that are not included in the feature set $f_2$, such as a cache storage feature.

The server 108 identifies the remaining data responsive to the request 114. For example, the server 108 can identify the name of the user interacting with the web browser 104. The server 108 can generate a second response with a wrapped data structure as follows:
{
u: "http://www.foo.com/bar?id=4&ech=1"
c: 0
e: 1000
d: ", John."
},
where the value of c indicates that the server will not send any additional responses to the request 114.

The server 108 provides the second response to the communications library 102 and the communications library 102 extracts the wrapped data from the second response. The communications library 102 matches the second response with the first response based on the response id e of "1000" and combines the extracted first and second data. The communications library uses the combined data to generate an extracted response 118 and sends the extracted response 118 to the first client module 110a. The extracted response 118 can include one or more feature values from the response 116 or the second response. The first client module 110a can render, or otherwise use, the extracted response data, e.g., to render "Hello there, John" on the web browser 104.

Both of the client modules 110a-b can send communication requests to the communications library 102 and receive responses from the communications library 102 without knowledge of the other modules. For example, the first client module 110a and the second client module 110b can send communication requests to the communications library 102 at the same time. The communications library 102 can process both communication requests at the same time or separately depending on the selected transport protocol. The communications library 102 can receive the responses to the requests and can provide each response to the respective client module without the client modules 110a-b knowing about the other client module or the other responses.

§2.2 Example Environment with Multiple Servers

Figure 2:
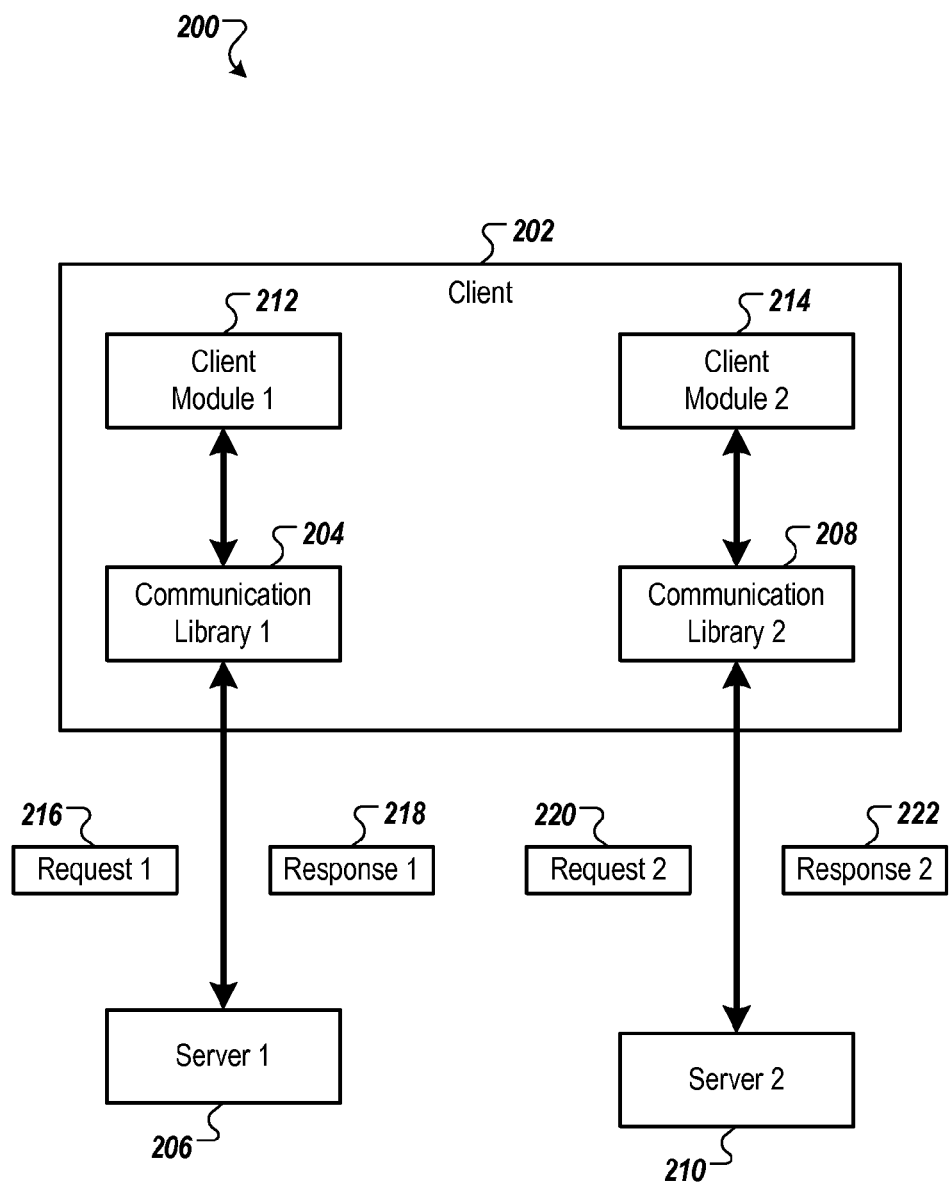
FIG. 2 is a block diagram of an example environment with multiple instances of a communications library running on a client device and communicating with different servers.

FIG. 2 is a block diagram of an example environment 200 with multiple instances of a communications library running on a client device 202 and communicating with different servers. For example, a first instance of the communications library 204 can request resources from a first server 206 and a second instance of the communications library 208 can request resources from a second server 210.

To illustrate, assume that a web browser (not shown) requests resources from a publisher's server 206 and resources from an advertiser's server 210 for a single web page. The web browser receives the communications library and script for a first client module 212 from the first server 206 in response to the request and dynamically loads the first instance of the communications library 204. The web browser receives a second client module 214 and a second instance of the communications library 208 from the second server 210 in response to the request and dynamically loads the second instance of the communications library 208.

When the first client module 212 sends a communication request to the first instance of the communications library 204, the first instance of the communications library 204 sends a first request 216 to the first server 206. The first server 206 identifies resources responsive to the first request 216, wraps the identified resources together with feature values from a feature set F, and provides the wrapped data to the first instance of the communications library 204 in a first response 218.

The first instance of the communications library 204 extracts the wrapped resources and feature values from the first response 218, processes the resources included in the wrapped data according to the feature values, and provides the resources to the first client module 212.

Similarly, the second instance of the communications library 208 sends a second request 220 to the second server 210 and the second server 210 processes the request and provides a second response 222 to the second instance of the communications library 208.

Each of the instances of the communications library is running the same code in the web browser. For example, each of the instances is associated with a single server and the multiple instances of the communications library cannot send or receive requests from the other instances. Running multiple instances of the communications library allows the web browser to communicate with multiple different web servers at the same time while using the communications library, where the multiple instances of the communications library are associated with a single page or multiple different pages.

In some implementations, the multiple different instances of the communications library can run in different client agents. For example, a first instance can run in a web browser and a second instance can run in a media player that is playing streaming media.

In some implementations, the communications library is a browser extension and is loaded at the same time as the browser. For example, when a user of the client device 202 launches the web browser an instance of the communications library is loaded at the same time as the browser. When the first server 206 communicates with the web browser, the first server 206 can determine that the communications library is a browser extension and does not need to be provided to the web browser. Client modules running on the browser can use the currently running instance of the communications library to communicate with the first server 206. When the second server 210 communicates with the web browser, the second server 210 can determine that the communications library is a browser extension and scripts, provided to the web browser by the second server 210, can request that the web browser load a new instance of the communications library.

In some implementations, the communications library is built directly into a client agent. For example, the code for the client agent includes the code for the communications library as a part of the client agent library.

In some implementations, the server 206 can set features values in the communications library before sending the communications library to the client device 202. For example, the feature values can be based on the client agent requesting the communications library. The feature values can be used to determine the transport protocol selected by the communications library or other default feature values, e.g., a maximum amount of outstanding requests to be supported by a server at the same time.

§3.0 Example Process Flows

Figure 3:
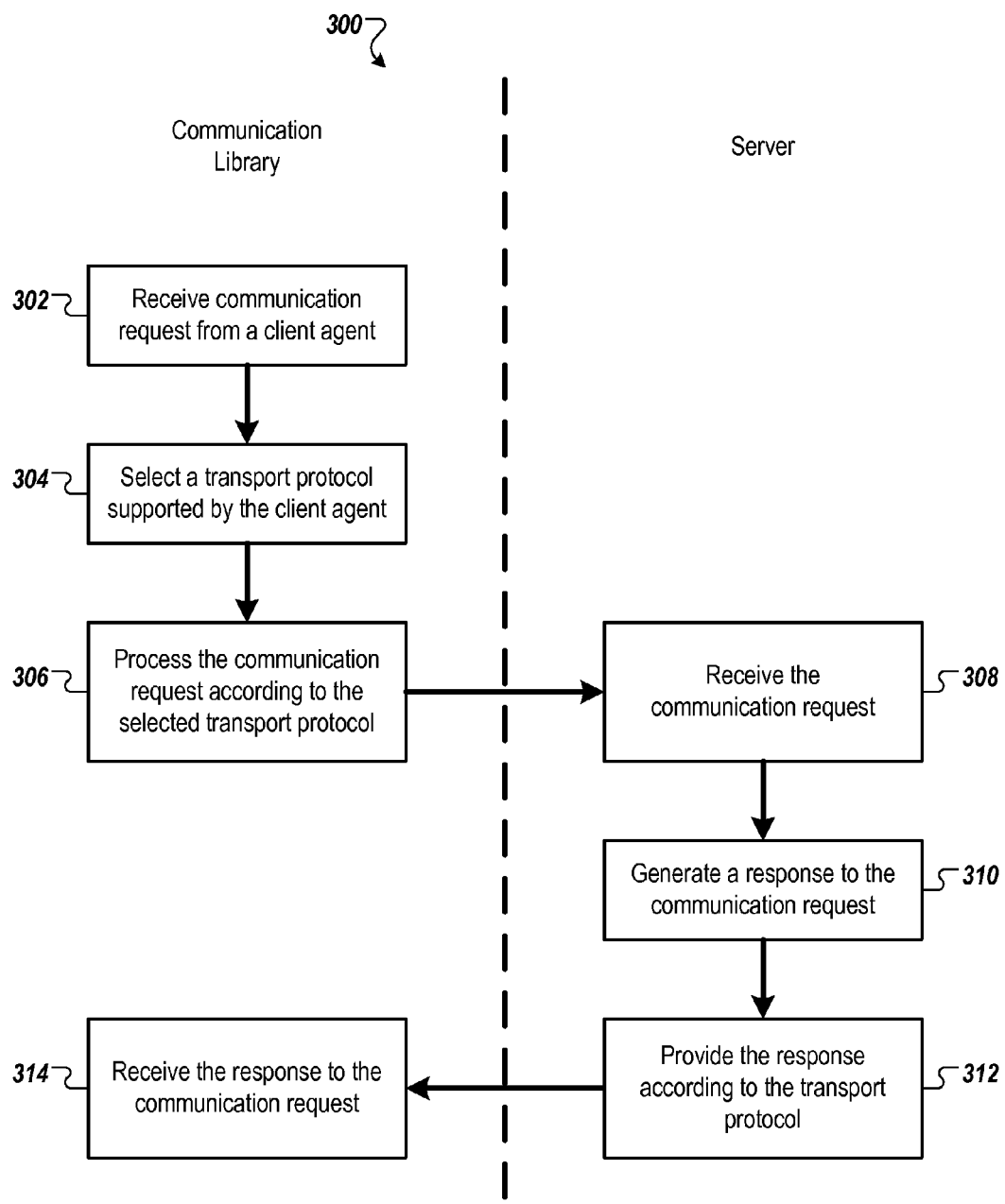
FIG. 3 is a flow diagram of a process for generating a request according to a selected transport protocol and proving a response to the request.

FIG. 3 is a flow diagram of a process 300 for generating a request according to a selected transport protocol and proving a response to the request. The process 300 can be used by the communications library 102 to request resources from the server 108. The process steps 302-306 can be performed by a client independently of the process steps 308-312 performed by a server, e.g., when the server is a server that cannot include feature values independent of the transport protocol in a data response.

The communications library receives a communication request from a client module (302). The communication request is independent of a transport protocol. For example, the communications library receives a communication request from a JavaScript module running in a client agent, e.g., a web browser. The communication request is not formatted for and does not include feature values specific to a particular transport protocol.

The communications library selects a transport protocol supported by the client agent (304). For example, the communications library includes a ranked list of transport protocols and selects the highest ranked transport protocol that is supported by the client agent.

The communications library processes the communication request according to the selected transport protocol (306). For example, the communications library appends feature identifiers and associated feature values to the communication request and sends the modified communication request to the server. The feature values include a feature value indicating the selected transport protocol.

The server receives the communication request (308). The communication request is received from a client device and processed according to the selected transport protocol. For example, the communication request is received from a communications library running on the client device. The server can parse the communication request in order to identify feature values associated with the communication request, including a feature value indicating the selected transport protocol.

The server generates a response to the communication request (310). The response includes data responsive to the communication request and one or more feature values specifying one or more communication features for the communication request. Each communication feature is independent of the selected transport protocol. For example, the server generates a data wrapper around the responsive data and feature values. The feature values indicate communication features that should be used by the client, e.g., caching information.

In some implementations, the response is a JSON object that includes a resource locator that identifies a resource returned in the response, a cache storage value defining a cache management operation for the cache with respect to the response, and/or a response identifier that identifies the response. The response identifier can match other response identifiers in other JSON objects in other responses where the other response and the response are partial responses to the communication request that form a complete response when aggregated together.

The server provides the response according to the transport protocol (312). For example, the server sends the response to the client according to the selected transfer protocol identified in the communication request.

The communications library receives the response to the communication request (314). For example, the communications library receives the response and stores the response in a local cache. The communications library parses the data responsive to the communication request and the feature values from the response, provides the data to the client module, and identifies cache storage and cache timeout values in the feature values. When the cache storage value is a first value, e.g., one, the communications library can store the data in the local cache until a timeout event based on the cache timeout value occurs. Alternatively, the response to the communication request is deleted from the cache when the cache storage value is a second value, e.g., zero.

§4.0 Example Timing Diagram

Figure 4:
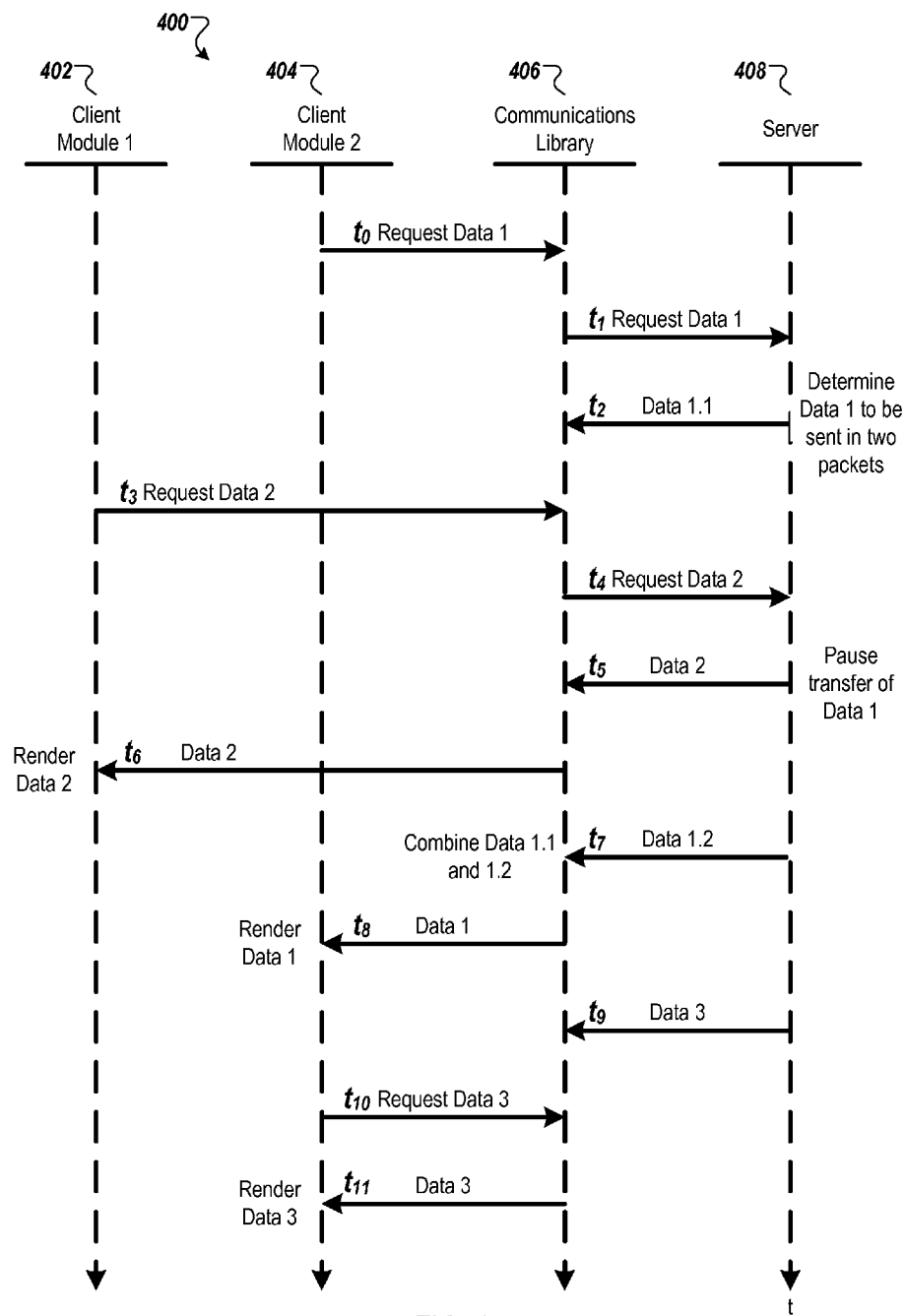
FIG. 4 is a timing diagram of an example process in which communication requests are received and processed by a communications library.

FIG. 4 is a timing diagram 400 of an example process in which communication requests are received and processed by a communications library. The timing diagram 400 depicts a process associated with a first client module 402, a second client module 404, a communications library 406, and a server 408. The first client module 402 and the second client module 404 are included in a web page on a web browser, and the communications library 406 is loaded on the web browser.

At time $t_0$, the second client module 404 sends a first data request to the communications library 406. The data request is sent to the communications library 406 independent of any transport protocol. The communications library 406 selects a transport protocol to use when sending communication requests to the server 408. For example, the communications library 406 includes a ranked list of preferred transport protocols and selects the highest ranked protocol that is supported by the web browser.

The communications library 406 processes the data request, and at time $t_1$ sends a first data request to the server 408 using the selected transport protocol. The server 408 identifies data responsive to the first data request and determines that the identified data needs to be sent to the communications library 406 in two packets. For example, the server 408 determines that the first data request is a request for search results and identifies search results responsive to the first data request.

The server 408 combines the first portion of the data response$_{1.1}$ in a wrapper with feature values independent of the selected transport protocol as described above. At time $t_2$, the server 408 provides the data response$_{1.1}$ responsive to the first data request to the communications library 406 using the selected transport protocol, and the communications library 406 stores the data response$_{1.1}$ and the feature values in a local cache with a cache id. For example, the communications library 406 determines that the response is a partial response and the cache id is "bar?id=4" based on the feature values included in the wrapped data.

All additional data requests and data responses describe below with reference to the timing diagram 400 are sent using the selected transport protocol.

At time $t_3$, the first client module 402 sends a second data request to the communications library 406. The communications library 406 determines a cache id associated with the second data request and searches the local cache for data responsive to the second data request.

The communications library 406 determines that the local cache does not include data responsive to the second data request, and at time $t_4$ sends a second data request to the server 408. The server 408 determines that a second data response responsive to the second data request requires less bandwidth to transfer to the communications library 406 than the first data response and pauses transfer of the data responsive to the first data request. Alternatively, the server 408 can determine that the second data request is of higher priority than the first data request and pauses transfer of data responsive to the first data request. For example, the server 408 can determine that the second data request is a query suggestion request which requires less bandwidth than sending the remaining search results responsive to the search result request.

At time $t_5$, the server 408 provides the second data responsive to the second data request to the communications library 406. For example, the server 408 provides query suggestions to the communications library 406.

The communications library 406 identifies the client module that requested the second data, and at time $t_6$ provides the second data to the first client module 402. For example, the communications library 406 can determine that the second data contains query suggestions by identifying a feature value included in the wrapper with the second data and determine that the first client module 402 requested query suggestions. Alternatively, the communications library 406 can determine that the first client module 402 provided the second communication request to the communications library 406, that the second data includes a request id "ech=2," and provide the second data to the first client module 402 based on the request id.

The first client module 402 renders the second data in the web page. For example, the query suggestions are rendered in a search page.

The server 408 resumes transfer of the first data results, and at time $t_7$ sends the second portion of the data response$_{1.2}$ responsive to the first data request to the communications library 406. The communications library 406 determines that all of the data responses responsive to the first data request have been received and combines the data response$_{1.1}$ and the data response$_{1.2}$. For example, the communications library 406 uses the cache id "bar?id=4" to identify all of the data stored in the cache that is responsive to the first data request.

At time $t_8$, the communications library 406 provides the first data response to the second client module 404 and the second client module 404 renders the data. For example, the second client renders the search results in the search page.

In some implementations, the server 408 can push data to the communications library 406 when the server 408 determines that the communications library 406 might request the data. For example, the server 408 determines that a third data resource has a probability of being requested by the communications library 406 greater than a threshold probability. At time $t_9$, the server 408 provides the third data resource to the communications library 406. For example, the server 408 determines that the communications library 406 is likely to request additional search results.

At time $t_{10}$, the second client module 404 sends a third data request to the communications library 406 and the communications library 406 searches the local cache to determine if data is stored locally (e.g., on a client) that is responsive to the third data request. The communications library 406 identifies the third data resource as being responsive to the third data request. For example, the communications library 406 determines that a cache id in the third data request and a cache id for the third data resource are the same.

At time $t_{11}$, the communications library 406 provides the third data resource to the second client module 404 and the second client module 404 renders the third search results in the web page. Pushing of data from the server 408 to the communications library 406 can allow a client module to render content in the web page more quickly than if the client module had to otherwise wait for a response from the server 408. For example, a user can enter in a search term in the search page and immediately view search results responsive to the search term.

§5.0 Optional Implementation Features

In some implementations, when multiple responses include the same cache key, the communications library replaces the older response stored in the local cache with the newest response. For example, the server 408 provides news search results to the communications library 406. The server 408 determines that the news search results are going to be presented in the web page again and that updated news search results should be provided to the communications library 406. The communications library 406 can receive the updated news search results, compare the cache id of the updated news search results with the cache id of the older news search results, remove the older news search results from a local cache, and store the updated news search results in the cache. When a client module requests news search results, using the same cache id, the communications library 406 will provide the client module with the updated news search results.

In some implementations, the communications library 406 does not store partial responses in a local cache until all partial responses responsive to a communication request have been received. For example, the communications library 406 determines that a partial response id, e.g., the value c in the data above, is one and additional partial responses will be received with the same response id e. When the communications library 406 receives a partial response with a partial response id of zero, the communications library identifies all partial responses with the same response id e, aggregates the data in the partial responses together, and stores the aggregated data and associated feature values in the local cache.

In some implementations, a library other than the communications library caches responses and retrieves cached responses. For example, the communications library 406 can receive a response from the server 408 and provide the response to a cache library loaded on the web browser. The communications library 406 can query the cache library for cached responses before sending communication requests to the server 408. Alternatively, the client modules can query the cache library for data responsive to a communication request before sending the communication request to the communications library 406.

In some implementations, a communications request from a client module can indicate that if data responsive to the request is not stored in a local cache then the communications library 406 should not send a communications request to the server 408. For example, the client module can request search results from the communications library 406 and indicate with a feature value that if the search results are not stored locally the communications library 406 should conserve bandwidth by not requesting the search results from the server 408.

In some implementations, for each communications request received from client modules, the communications library 406 can search a local cache. If the communications library 406 locates data responsive to the request, the communications library 406 can provide the data to the respective client module. For example, at time $t_7$, the communications library 406 can store the first data response in a local cache for a default amount of time. At a time after $t_{11}$, the second client module 404 can request the first data response from the communications library 406. The communications library 406 can determine that the default amount of time has not passed since the first data response was stored in the cache and provide the first data response to the second client module 404.

In some implementations, the communications library 406 searches a local cache for data responses based on the type of communication request or a function. For example, the communications library 406 can search the local cache after receiving a request for search results and not search the local cache after receiving a request for query suggestions. Alternatively, the communications library 406 can use a function to determine when to search the local cache for data responsive to a communication request.

In some implementations, the communications library 406 can determine that a partial response received from the server 408 can be rendered. For example, a feature value received in the same wrapper as the data response$_{1.1}$ can indicate that the data currently received can be rendered. After time $t_2$, the communications library can provide the partial data response$_{1.1}$ to the second client module 404 and the second client module 404 can render the partial data response$_{1.1}$. At time $t_7$, when the communications library 406 receives the remaining partial data response$_{1.2}$, the communications library 406 provides the partial data response$_{1.2}$ to the second client module 404. The second client module 404 renders the partial data response$_{1.2}$ in the same web page as the partial data response$_{1.1}$.

In some implementations, the selected transport protocol can support multiplexing. For example, at time $t_2$, when the server 408 has two outstanding data requests, the server 408 can provide responses to both requests at the same time and sending of the first data response need not be paused. In some implementations, a feature value specified by a client module can indicate whether multiplexing should be used. For example, if the feature value is zero, the communications library 406 and the server 408 will not use multiplexing even if multiplexing is supported by the selected transport protocol.

In some implementations, the first client module 402 sends a communication request to the communications library 406 and the communications library 406 provides the data responsive to the communication request to the second client module 404. For example, the first client module 402 is a query input field in a search page and provides a search query to the communications library 406. The communications library 406 can provide the search results responsive to the search query to the second client module 404, e.g., when the second client module 404 is the script that renders the search results in the search page.

In some implementations, the first client module 402 sends multiple requests to the communications library 406 as part of a single communication request. For example, when second client module 404 is loaded in the web page, the second client module 404 can notify the communications library 406 that the second client module 404 wants to send a communication request. The notification can indicate feature values, such as that the second client module 404 wants to allow multiplexing, while leaving other feature values as defaults. The second client module 404 can request that the communications library 406 open a communication channel with the server 408. The communications library 406 can select a transport protocol that allows multiplexing and open a communication channel with the server 408. The second client module 404 can determine that the communication channel is open and provide a communication request to the communications library 406.

§6.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer readable medium encoded with instructions executable by a computer, the instructions comprising:
    a communications library that can be implemented in client agents of different types, the communications library supporting a plurality of transport protocols, each of the client agents supporting one or more of the transport protocols; and
    wherein upon such execution the instructions cause the computer to perform operations comprising:
        receiving, from multiple client modules executing in different client agents on the computer, a respective communication request not formatted according to any of the transport protocols and specifying a subset of at least two of the plurality of transport protocols;
        determining, for a first subset of the communication requests, that at least one transport protocol is included in the respective subset of the transport protocols specified by the respective client agent and included in the plurality of transport protocols supported by the communications library;
        for each of the communication requests in the first subset of the communication requests and in response to determining that at least one transport protocol is included in the respective subset of the transport protocols specified by the respective client agent and included in the plurality of transport protocols supported by the communications library:
            selecting one of the transport protocols of the respective subset of the transport protocols specified by the respective client agent and included in the plurality of transport protocols supported by the communications library;
            sending the respective communication request according to the respective selected transport protocol; and
            receiving a corresponding communication response according to the respective selected transport protocol; and
        determining, for a second subset of the communication requests that is mutually exclusive from the first subset of the communication requests, that no transport protocols are included in both the respective subset of the transport protocols specified by the client agent and the plurality of transport protocols supported by the communications library, and that no communication request should be sent.

2. The computer readable medium of claim 1, wherein:
    the communications library defines the plurality of communication features, each communication feature being independent of the transport protocols; and
    receiving, from at least one of the client modules, the respective communication request comprises receiving the respective communication request that includes one or more feature values specifying one or more communication features for the corresponding communication request.

3. The computer readable medium of claim 2, wherein:
    the communication features include preferred transport protocols, and the respective communication request further includes feature values specifying a list of at least two preferred transport protocols; and
    selecting, for at least one of the client agents, one of the transport protocols of the respective subset of the transport protocols specified by the respective client agent comprises:
        determining which of the preferred transport protocols the client agent supports; and
        selecting two of the preferred transport protocols the client agent is determined to support.

4. The computer readable medium of claim 2, wherein the communication features include a multiplexing value specifying whether a response to the communication request can be multiplexed from a server.

5. The computer readable medium of claim 2, the instructions further comprising processing, for at least one of the communication requests in the first subset of the communication requests, the corresponding received communication response according to one or more features values included in the communication response.

6. The computer readable medium of claim 5, wherein:
    the plurality of communication features include a cache storage and a cache timeout; and
    the feature values define a cache timeout value and a cache storage value; and
    processing, for at least one of the communication requests in the first subset of the communication requests, the received communication response according to the one or more first features values comprises:
        storing the communication response in the cache when the cache storage value is a first value;
        deleting the communication response from the cache when the cache storage value is a second value; and
        querying the cache for the communication response as a response to another communication request only when a timeout event based on the cache timeout value has not yet occurred.

7. The computer readable medium of claim 1, wherein receiving, for each of the communication requests in the first subset of the communication requests, the corresponding communication response according to the respective selected transport protocol comprises receiving the corresponding communication response according to the respective selected transport protocol including one or more feature values in a wrapper and data responsive to the respective communication request, the feature values specifying a plurality of communication features for the communication response independent of the respective selected transport protocol.

8. The computer readable medium of claim 7, wherein at least one of the feature values is not supported by at least one of the plurality of transport protocols supported by the communications library.

9. The computer readable medium of claim 7, wherein at least one of the feature values is included in a header of the communication response and the wrapper.

10. The computer readable medium of claim 1 comprising:
    determining that a subset of the respective communications requests specify the same destination; and opening a single communication channel between the communications library and a computer identified by the specified destination, wherein sending, for the subset of the respective communications requests, the respective communication request according to the respective selected transport protocol comprises sending the respective communication request to computer.

11. A non-transitory computer readable medium encoded with instructions executable by a data processing apparatus supporting a plurality of transport protocols, and that cause the data processing apparatus to perform operations comprising:

receiving, from each of multiple client agents included on a client device that includes a communications library that can be implemented in the client agents and supports each of the plurality of transport protocols, a communication request processed according to a selected transport protocol from the plurality of transport protocols that the client device determined was supported by both the communications library and the respective client agent for which the communication request was created;

generating, for each of the communication requests, a corresponding communication response to the respective communication request, the corresponding communication response including data responsive to the respective communication request and one or more feature values in a wrapper specifying one or more communication features for the corresponding communication response, each communication feature being independent of the selected transport protocol; and providing, for each of the communication requests, the corresponding communication response to the client device according to the selected transport protocol.

12. The computer readable medium of claim 11, wherein: the communication features include a cache storage and a cache timeout, and the corresponding feature values for at least one of the communication responses define a cache timeout value and a cache storage value, the cache value being used by a client device to determine whether to store the corresponding communication response in the cache or delete the corresponding communication response from the cache, and the cache timeout value being used by the client device to determine whether to query the cache for the corresponding communication response as a response to another communication request.

13. The computer readable medium of claim 12, wherein at least one of the communication responses is a JavaScript Object Notation (JSON) object that includes:
a resource locator that identifies a resource returned in the corresponding communication response; and
a cache storage value defining a cache management operation for the cache with respect to the corresponding communication response.

14. The computer readable medium of claim 13, wherein the JSON object includes a response identifier that identifies the corresponding communication response and that matches other response identifiers in other JSON objects in other responses, wherein the other response and the corresponding communication response are partial responses to the respective communication request that form a complete response when aggregated together.

15. The computer readable medium of claim 13, wherein: each communication request includes a unique response identifier;

generating, for each of the communication requests, the corresponding communication response to the respective communication request comprises generating, for each of the communication requests, the corresponding communication response that includes the unique response identifier associated with the respective communication request to which the response is responsive.

16. The computer readable medium of claim 11, wherein at least one of the feature values is included in a header of the communication response and the wrapper.

17. The computer readable medium of claim 11, wherein at least one of the feature values is not supported by at least one of the plurality of transport protocols.

18. The computer readable medium of claim 11, wherein the feature values are not formatted according to a specific one of the transport protocols.

19. A computer-implemented method performed by a computer, comprising:

accessing a communications library stored in a computer memory of the computer, the communications library supporting client agents of different types, the communications library supporting a plurality of transport protocols, each of the client agents supporting one or more of the transport protocols;

receiving, from multiple client modules executing in different client agents on the computer, a respective communication request not formatted according to any of the transport protocols and specifying a subset of at least two of the plurality of transport protocols;

determining, for a first subset of the communication requests, that at least one transport protocol is included in the respective subset of the transport protocols specified by the respective client agent and included in the plurality of transport protocols supported by the communications library;

for each of the communication requests in the first subset of the communication requests and in response to determining that at least one transport protocol is included in the respective subset of the transport protocols specified by the respective client agent and included in the plurality of transport protocols supported by the communications library:
selecting one of the transport protocols of the respective subset of the transport protocols specified by the respective client agent and included in the plurality of transport protocols supported by the communications library;
sending the respective communication request according to the respective selected transport protocol; and
receiving a corresponding communication response according to the respective selected transport protocol; and determining, for a second subset of the communication requests that is mutually exclusive from the first subset of the communication requests, that no transport protocols are included in both the respective subset of the transport protocols specified by the client agent and the plurality of transport protocols supported by the communications library, and that no communication request should be sent.

20. A computer-implemented method performed by a data processing apparatus supporting a plurality of transport protocols, comprising:

receiving, from each of multiple client agents included on a client device that includes a communications library that can be implemented in the client agents and supports each of the plurality of transport protocols, a communication request processed according to a selected transport protocol from the plurality of transport protocols that the client device determined was supported by both the communications library and the respective client agent for which the communication request was created;

generating, for each of the communication requests, a corresponding communication response to the respective communication request, the corresponding communication response including data responsive to the respective communication request and one or more feature values in a wrapper specifying one or more communication features for the corresponding communication response, each communication feature being independent of the selected transport protocol; and providing, for each of the communication requests, the corresponding communication response to the client device according to the selected transport protocol.

\* \* \* \* \*